March 20, 1928. 1,663,391
G. A. SHAFFER ET AL
FOLDED SHEET AND METHOD OF FOLDING THE SAME
Filed Feb. 28, 1927 2 Sheets-Sheet 1
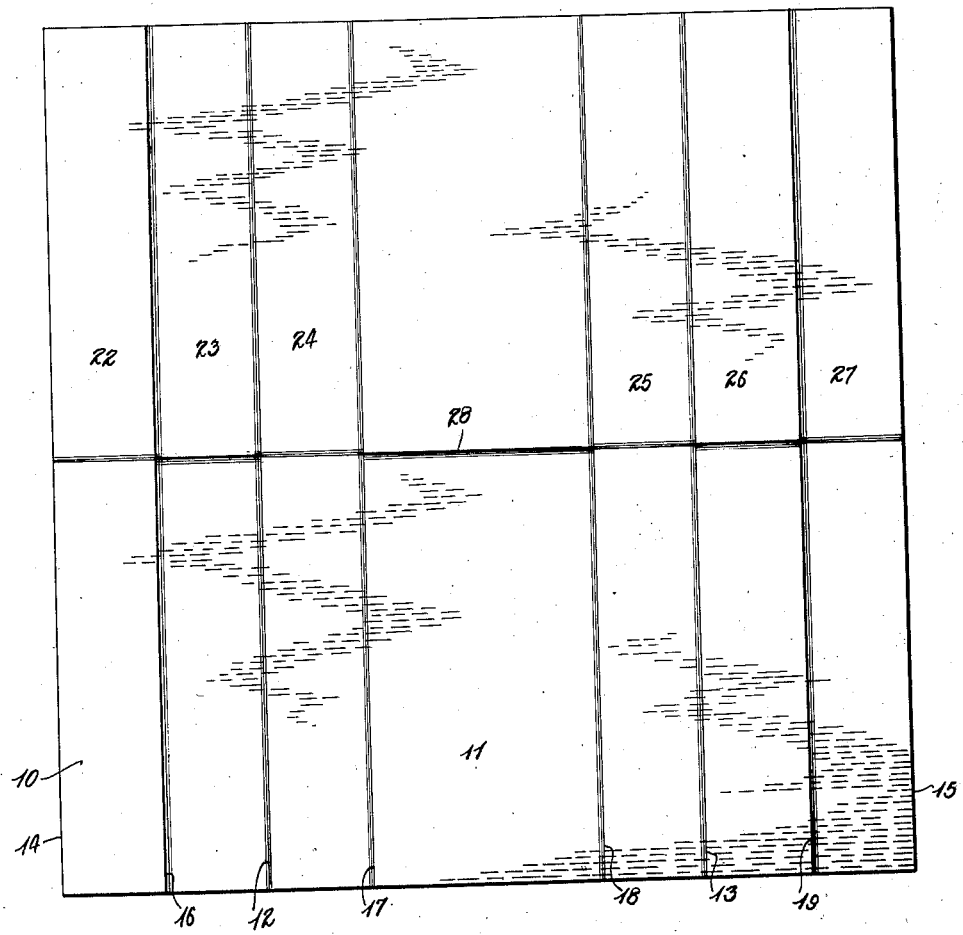
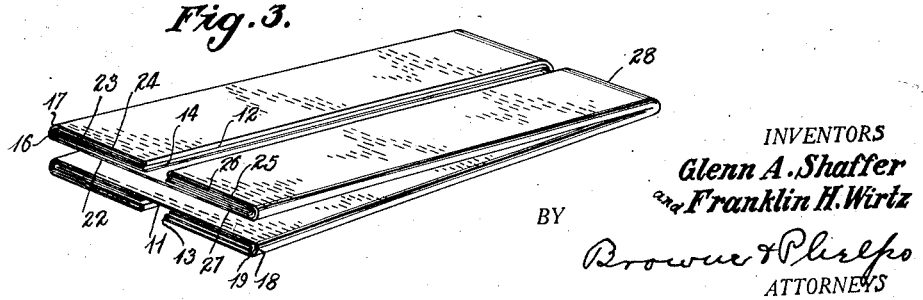
INVENTORS
Glenn A. Shaffer
and Franklin H. Wirtz
BY
ATTORNEYS March 20, 1928.
G. A. SHAFFER ET AL
1,663,391
FOLDED SHEET AND METHOD OF FOLDING THE SAME
Filed Feb. 28, 1927    2 Sheets-Sheet 2
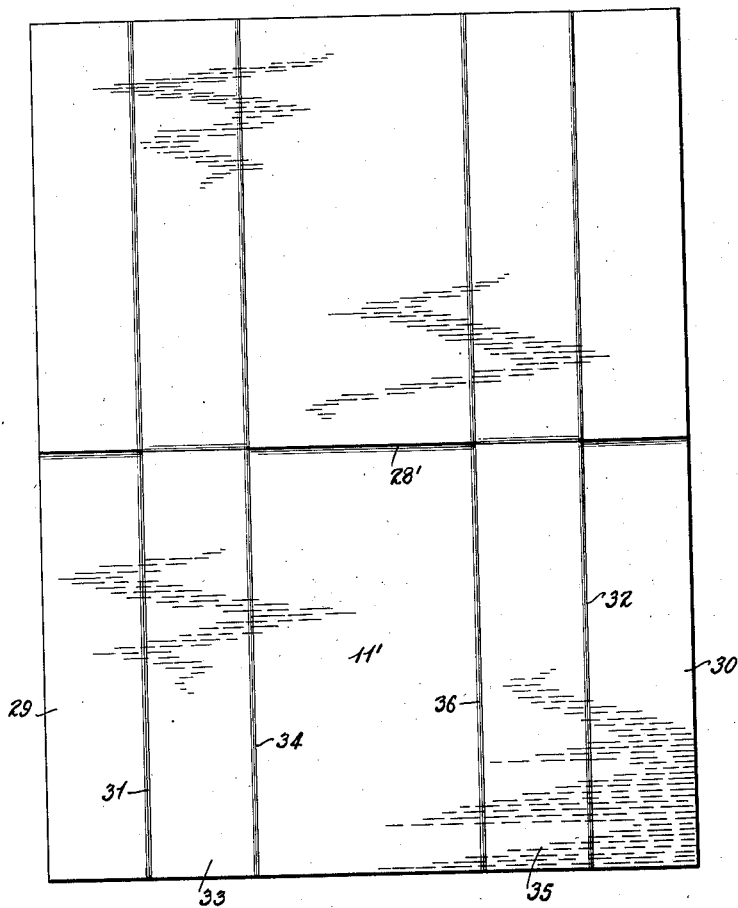
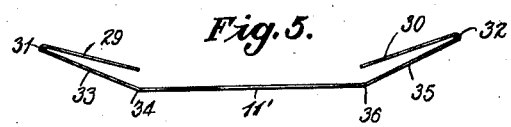
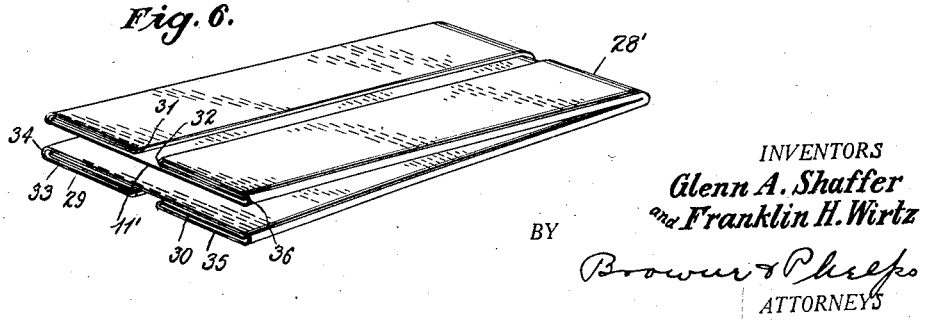
INVENTORS
Glenn A. Shaffer
and Franklin H. Wirtz
BY
ATTORNEYS Patented Mar. 20, 1928.

1,663,391

UNITED STATES PATENT OFFICE.

GLENN A. SHAFFER AND FRANKLIN H. WIRTZ, OF GREEN BAY, WISCONSIN, ASSIGNORS TO FORT HOWARD PAPER COMPANY, OF GREEN BAY, WISCONSIN, A CORPORATION OF WISCONSIN.

FOLDED SHEET AND METHOD OF FOLDING THE SAME.

Application filed February 28, 1927. Serial No. 171,703.

The invention relates to folded sheets, as napkins or the like, and has as an object the provision of a folded sheet which will have tabs exposing edges adjacent the center of the fold which tabs may be grasped by the user to withdraw the sheet from a fixture or receptacle and will comprise the larger portion of the sheet.

It is a further object of the invention to provide a fold of the nature indicated of such a character that sheets of different sizes may be folded to form a package of uniform size and the outward appearance of each folded sheet of the different sizes will be the same.

It is a further object of the invention to provide a fold having a minimum number of raw edges exposed upon the package made up of the folded sheets.

Further objects of the invention will appear from the following description when read in connection with the accompanying drawings showing an illustrative embodiment of the invention, and wherein:—

Fig. 1 is an extended sheet of a large size showing the crease lines resulting from the fold;

Fig. 2 is a diagrammatic end view of the sheet of Fig. 1 partially folded;

Fig. 3 is a perspective view of the completely folded sheet of Fig. 1;

Fig. 4 is a view similar to Fig. 1 of a narrower sheet;

Fig. 5 is a view similar to Fig. 2 of the partially folded sheet of Fig. 4, and

Fig. 6 is a perspective view of the completely folded sheet of Fig. 4.

As shown in Figs. 1 to 3 inclusive, the sheet 10 comprises a center portion 11, and in producing the fold of these figures, the sheet 10 is first folded about longitudinal lines 12, 13, to bring the edges 14, 15 of the sheet to the position shown in Fig. 2. The resulting fold is then folded simultaneously along the crease lines 16, 17, and 18, 19, to bring the edges 20, 21 of the fold of Fig. 2 into registry with the edges 14, 15 of the sheet at the position adjacent the center of portion 11. The sheet will then be found to be folded so that the tab made up of portions 22, 23, and 24 and also the tab made up of portions 25, 26, and 27 are superposed upon the center portion 11.

The thus folded sheet is then doubled upon the line 28 to produce the final fold shown in Fig. 3. When a package is made up of these sheets it may be opened and placed either side up in a receptacle or fixture whereupon each sheet as it becomes exposed by removal of others will present the tabs exposed adjacent the center of the portion 11 of the sheet to be grasped by the hand of the user for withdrawal.

In the form of Figs. 4 to 6 inclusive, the portions 29, 30 are first folded along the crease lines 31, 32 into the position shown in Fig. 5, and the portions 29, and 33 are next folded about the crease line 34. Also, the portions 30 and 35 are folded about the crease lines 36 to bring the edges formed along crease lines 31, 32 to a position adjacent the center of portion 11' of the sheet.

The thus folded sheet is again folded along the line 28' to produce the final article shown in Fig. 6. It will be seen that the final fold of Fig. 6 will be of the same overall dimensions as the final fold of Fig. 3, varying therefrom only in thickness. The two sheets can hardly be told apart in their folded position except by counting the thicknesses of paper comprising the tabs at the end when they are exposed.

The package made up of these sheets will have raw edges exposed at one edge only of the package thereof and the tabs which are grasped by the user are thick and therefore will not tear while withdrawing the napkin thus folded from a dispensing receptacle.

Minor changes may be made in the physical embodiment of the invention within the scope of the appended claims without departing from its spirit.

We claim:

1. A folded napkin or the like comprising a center portion of single thickness, tabs provided by folding the margin of the sheet inwardly upon said center portion to provide folded portions having a plurality of thicknesses, the edges of said tabs superimposed upon said center portion, said thus folded sheet being folded transversely to bring a tab upon the exterior portion of each of the two sides of the finished fold.

2. A folded napkin or the like comprising a center portion of a single thickness, the edge portions of said sheet being folded upon longitudinal lines, to superimpose one portion thereof upon another portion thereof, said edge portions then being folded upon lines parallel to said first named lines to superimpose said folded margins upon said center portion to provide tabs having their edges lying adjacent each other and adjacent the center portion of said first named single thickness and the thus resulting fold being folded transversely to provide a fold of one-half the length of said first named fold with tabs exposed upon the opposite sides of the finally folded sheet.

3. A folded napkin or the like comprising a center portion of two thicknesses presenting raw edges at one transverse end, a folded edge at the opposite transverse end and presenting folded edges at the opposite longitudinal sides with tabs resulting from initially folding the margins of the sheet upon themselves, said tabs lying upon the opposite sides of said double thickness portion with the edges of said tabs lying adjacent upon said opposite sides and adjacent the center portion of said double thickness.

4. The method of folding a napkin which comprises folding a sheet upon parallel longitudinal lines adjacent the margin thereof to produce a plurality of thicknesses, again folding said sheet upon lines parallel to said first named lines and nearer the center of said sheet to bring the folded edge of said first named portion to a position superimposed upon a center single thickness portion adjacent each other and the center of said portion, transversely folding the thus produced fold to bring said single thickness portions into contact with said folded margins upon opposite sides of the final fold.

5. The method of folding a napkin which comprises folding a sheet of paper upon lines parallel with the margin thereof to bring the edges of said paper adjacent each other and the center of the single thickness center of the sheet, again folding the resulting two thickness portions upon lines parallel to said first named lines between the center of the said portion and said first named lines to bring the first produced folded edges into registry with the edges of the sheet in their adjacent positions and again folding the thus resulting fold upon a transverse line to produce a final fold having a center portion of two thicknesses with the folded portions lying upon opposite sides of the said center portions.

GLENN A. SHAFFER.
FRANKLIN H. WIRTZ.